(12) United States Patent
Nagasawa et al.

(10) Patent No.: US 6,240,494 B1
(45) Date of Patent: May 29, 2001

(54) SUBSYSTEM REPLACEMENT METHOD

(75) Inventors: Teruo Nagasawa; Takeshi Koide; Katsunori Nakamura, all of Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/212,410

(22) Filed: Dec. 16, 1998

(30) Foreign Application Priority Data

Dec. 24, 1997 (JP) .................................................. 9-355527

(51) Int. Cl.[7] .................................................. G06F 12/08
(52) U.S. Cl. .................................................. 711/165; 711/112
(58) Field of Search .................................................. 711/112, 165

(56) References Cited

PUBLICATIONS

EMC Corporation "Symmetrix ICDA family Product Announcement Summary", Nov. 6, 1995 of EMC Corporation.

*Primary Examiner*—Kevin L. Ellis
(74) *Attorney, Agent, or Firm*—Antonelli, Terry, Stout & Kraus, LLP (57) ABSTRACT

In order to enable data migration between old and new subsystems to be performed under stopless operation, a plurality of first access paths are prepared between a CPU and an old CU (old subsystem) having an old VOL and a plurality of third access paths are set between the old CU and a new CU (new subsystem) having a new VOL. The connection is switched from the first access paths of the old subsystem as a replacement source to the second access paths of the new subsystem as a replacement destination on a plurality of occasions. When the CPU accesses the new subsystem via the second access paths on the new subsystem side during the connection change, a path replacement controller relays the access to the old subsystem via the third access paths and allows the access to be processed. Data migration from the old subsystem to the new subsystem is executed after all of the first access paths are switched to the second access paths.

9 Claims, 11 Drawing Sheets

SUBSYSTEM REPLACEMENT METHOD

BACKGROUND OF THE INVENTION

The present invention relates to a subsystem replacement technique and, more particularly, to a subsystem replacement operation of a central processing unit in an information processing system which is used on the precondition of stopless operation, or the like.

Data migration denotes a migration of data in an old disk subsystem functioning as an external storage in an information processing system to a new disk subsystem.

Generally, as a method of migrating data between disk subsystems, a migration method using intervention of a central processing unit (CPU) is known. In the method, an access from a CPU to a device as a replacement destination is stopped, and the CPU reads data from an old disk subsystem and writes it into a new disk subsystem. According to the method, however, operations of the user to the disk subsystem are stopped for a long time during the data migration.

As techniques which enable the CPU to make an access also during data migration, there are an HODM (Hitachi Online Data Migration) function of Hitachi Limited, an extended remote copy function (hereinbelow, described as "XRC") and a peer-to-peer remote copy function (hereinbelow, "PPRC") ("IBM 3990 Model 6 Enhancements") of IBM Corporation, and symmetric data migration service (SDMS) ("SYMMETRIX ICDA family PRODUCT ANNOUNCEMENT SUMMARY", Nov. 6, 1995) of EMC Corporation.

According to the method of the HODM, an access of the CPU to the old disk subsystem is stopped first. After that, the connection is switched from an access path between the CPU and the old disk subsystem to that between the CPU and a new disk subsystem, and further, an access path is newly provided between the old and new disk subsystems. After that, data of the old disk subsystem is read from the new disk subsystem through the new access path, thereby starting the migration and re-starting the access from the CPU. When the CPU accesses the area from which the data has been migrated, both of the old and new disk subsystems execute processes. When the CPU accesses an area from which the data has not been migrated, data read from the old disk subsystem is reflected also in the new disk subsystem and a process is executed. In this manner, the data migration during an access from the CPU can be realized.

According to the method of XRC, the old disk subsystem has a function of assuring data written from the CPU in a disk controller and the CPU has a function of reading the assured data. By writing the data into the new disk subsystem, the data migration during the access from the CPU can be realized.

According to the method of PPRC, the old and new disk subsystems are connected to each other and are provided with a function of communicating with each other. By writing write data of the CPU to the old disk subsystem to the new disk subsystem by using the communication function, the data migration during the access from the CPU can be realized.

According to the method of SDMS, first, an access from the CPU to the old disk subsystem is stopped. Then, the connection is switched from an access path between the CPU and the old disk subsystem to that between the CPU and the new disk subsystem and, further, a new access path is provided between the old and new disk subsystems. After that, the data of the old disk subsystem is read by the new disk subsystem through the new access path, thereby starting migration. After starting the migration, the access from the CPU is re-started. When the CPU accesses a migrated area, the access is processed directly by the new disk subsystem. When the CPU accesses an area to which the migrating operation has not been executed, data of the track is read from the old disk subsystem and an ordinary process is performed by the new disk subsystem. In this manner, the data migration during the access from the CPU can be realized.

In the above-mentioned methods, by enabling a comprehensive access from the CPU to be performed also during the data migration, stop of an access to the data to be stored into the old disk subsystem can be suppressed to a time for switching from the old disk subsystem to the new disk subsystem. In case of control data of a system such as an OS, even if it is a momentary access stop, it stops the operations of the user and an influence by the migration work is severe. Especially, the access stop is not accepted by the user where 24-hour online operations are necessary. The number of such users is increasing and there is a problem such that the data migration cannot be carried out except for the system stop time such as a winter vacation from the end of the year to the beginning of the next year.

A single subsystem can be used by being connected to a plurality of CPUs. In this case, the subsystem discriminates each of the CPUs on the unit basis of the access path or a group of access paths. An equivalent access to the other subsystem has to be discriminated as well.

When the access path from the CPU is switched to the access path to the new subsystem while making the CPU continuously make accesses, the CPU recognizes that the access is continuously made to the same device. After the data migration is finished and the old subsystem is removed, there is a case that an input request of the device information is issued from the CPU for the purpose of confirmation of the device or the like. In the CPU which confirms the device and the access path in accordance with match/mismatch of device information read in the past with device information read this time. When the information of the new subsystem is sent at this time point, since the device information does not match with each other, it is determined that there is a failure in the access path. Consequently, it is feared that the access path is disconnected and the subsystem becomes down.

SUMMARY OF THE INVENTION

It is an object of the invention to provide a subsystem replacement technique which can continue an access from a higher level device to a subsystem also during switching operation from an old subsystem to a new subsystem.

It is another object of the invention to provide a subsystem replacement technique which can migrate data in a stopless state of operations without requiring to stop an access from a higher level device to a subsystem in association with data migration.

It is further another object of the invention to provide a subsystem replacement technique which can smoothly replace an old subsystem operating under the control of a plurality of higher level devices with a new subsystem in a stopless state of operations.

It is further another object of the invention to provide a subsystem replacement technique which realizes smooth subsystem replacement while avoiding occurrence of a failure caused by a change in environment such as device information in association with replacement of an old subsystem with a new subsystem.

Generally, a plurality of access paths are provided from a higher level device such as a CPU or a channel to a subsystem under the control of the higher level device, and the higher level device selectively switches the access paths and accesses to the subsystem. For example, even at the re-start time after interruption occurring in a series of commands issued in relation to an input/output processing request, there is a case such that an access path different from the original access path is selected and used. Since commands before the interruption and those after the interruption relate to the series of the processes, it is obviously understood that if the subsystem has not executed a command before the interruption, the subsystem cannot execute a command after the interruption. According to the invention, even if the access path is changed, the subsystem recognizes the change and can execute the series of commands.

According to the invention, when a plurality of access paths from a higher level device to an old subsystem and an access path between the old and new subsystems are provided, the connection is switched from the access paths between the higher level device and the old subsystem to the access paths between the higher level device and the new subsystem on a plurality of occasions. During the connection change, the access paths are connected from the higher level device to both of the old and new subsystems. In this period, when the higher level device accesses either the old or new subsystem, the accessed subsystem makes an equivalent access to the other subsystem through the access path, thereby relaying the access request. By the operation, the other subsystem executes a command before the interruption so as to be able to execute a command after the interruption.

The equivalent access has to be made by both of the old and new subsystems. When the subsystem which mainly processes the access during the connection change is decided, it is sufficient that the other subsystem makes the equivalent access. When the processing request from the higher level device is not interrupted or when the other subsystem does not receive a command after the interruption from the higher level device such as a case where the processing request from the higher level device is sent via a fixed access path, it is unnecessary to make an equivalent access to the other subsystem.

It is also possible to make an access to the other subsystem through a fixed access path so that the other subsystem does not receive one of successive commands from the higher level device, and to make an access different from that of the higher level device. In this manner, the connection can be switched from the old subsystem to the new subsystem by switching the access paths on a plurality of occasions without stopping the access from the higher level device.

For example, in the data migration in the disk subsystems, when the old disk subsystem is allowed to execute processes dominantly during the connection change and the new disk subsystem relays the access request via a third access path of the invention, the connection can be switched without stopping the access from the higher level device. If the connection is switched while performing the data migration, however, the old disk subsystem is accessed directly by the higher level device during the switching operation and there is a case that data is updated only in the old disk subsystem. When the data of a part which has been migrated is updated, the data of the part is failed to be migrated.

According to the invention, therefore, when the connection switch from the old disk subsystem to the new disk subsystem is realized by relaying an access request sent from the higher level device via a second access path to the new disk subsystem to the old subsystem through the third access path, after completion of the connection switch from the first access paths to the second access paths, the migration of data from the old subsystem to the new subsystem is started. Consequently, it is prevented that the data migrated part is updated not through the new disk subsystem, so that it is unnecessary to perform data migration again.

On the other hand, contrarily, when the new disk subsystem is allowed to execute processes dominantly during the connection change, that is, the old subsystem relays the access request from the higher level device received through the first access path to the new subsystem through the third access path during the connection change from the first access paths to the second access paths, the connection switch can be performed without stopping the access from the higher level device. When the higher level device, however, accesses data which has not been migrated to the new disk subsystem before and during the data migration, it cannot be processed.

Consequently, according to the invention, in this case, prior to the switch from the first access path to the old subsystem to the second access path to the new subsystem, data migration (copy) from the old subsystem to the new subsystem is completed in advance. After that, the old disk subsystem is allowed to relay an access request sent from the higher level device through the first access path to the new subsystem through the third access path, thereby realizing the connection switch from the old disk subsystem to the new disk subsystem.

In order to realize the connection switch during the data migration from the old subsystem to the new subsystem, it is sufficient to always update data of the old and new disk subsystems also during the switching operation.

According to the invention, therefore, in each of the old and new disk subsystems, the access requests received from the higher level device through the first or second access path are relayed to the other subsystem through the third access path, thereby enabling the connection switch during the data migration to be performed.

In the invention, in order to discriminate the access from which one of the plurality of higher level devices and notify the other subsystem of the access, the third access paths of the number equal to or larger than the number of higher level devices connected to the old disk subsystem are provided between the old and new disk subsystems. An access made via the third access path between the disk subsystems is associated with the access from each of the higher level device, thereby enabling the data migration when the old disk subsystem is connected to the plurality of higher level devices to be carried out. The number of the third access paths includes not only the number of physical access paths but also the number of logical access paths.

According to the invention, the new disk subsystem preliminarily issues a device information input request to the old disk subsystem and reads and stores the device information sent from the old disk subsystem in response to the request. In response to the device information input request from the higher level device, not the device information of the new disk subsystem but the stored device information of the old disk subsystem is transmitted.

DESCRIPTION OF THE PREFERRED EMBODIMENTS

Embodiments of the invention will be described with reference to the drawings.

(First embodiment)

Figure 1:
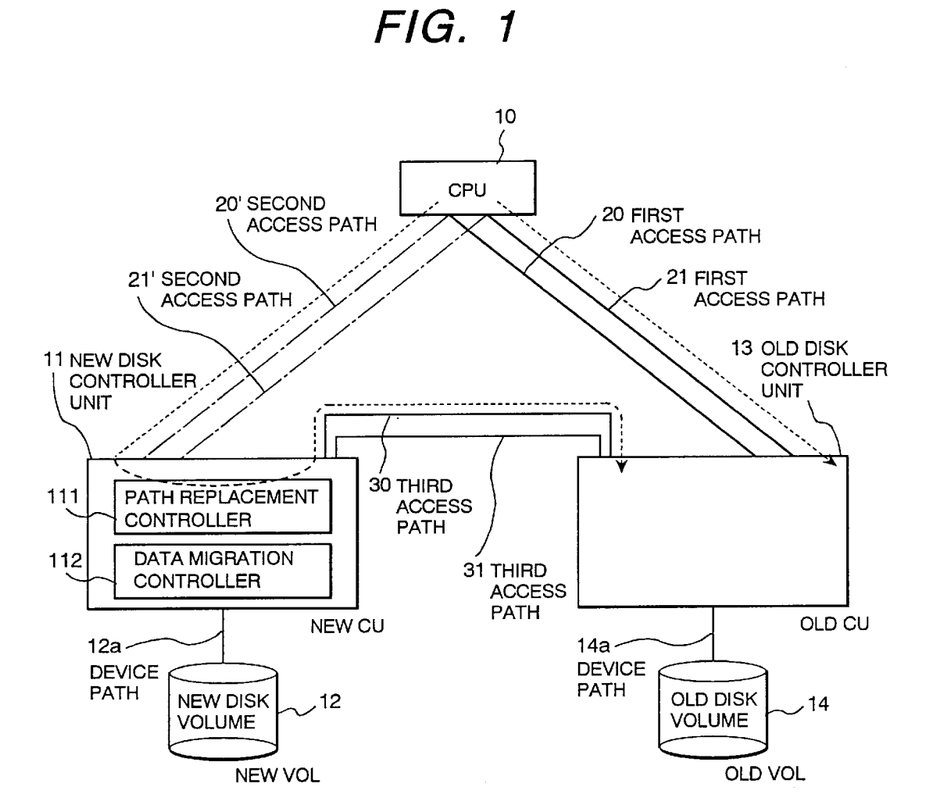
FIG. 1 is a conceptual diagram showing an example of the configuration and action of an information processing sys

FIG. 1 is a conceptual diagram showing an example of the configuration and action of a general computer system according to an embodiment of an information processing system to which a subsystem replacement method of the invention is applied.

According to the embodiment, the general computer system comprises: a central processing unit (CPU) 10; a new subsystem (a new disk subsystem) having a new disk controller unit 11 (hereinbelow, written as "new CU 11") serving as a destination of data migration and a new disk volume 12 (hereinbelow, written as "new VOL 12"); and an old subsystem (an old disk subsystem) having an old disk controller unit 13 (hereinbelow, described as "old CU 13") serving as a data migration source and an old disk volume 14 (hereinbelow, described as "old VOL 14").

The old VOL 14 is a storage medium operating under the control of the old CU 13 and in which data received from the CPU 10 via the old CU 13 is stored. Likewise, the new VOL 12 is a storage medium operating under the control of the new CU 11 and in which data received from the CPU 10 via the new CU 11 and data migrated from the old VOL 14 is stored.

The new CU 11 also has: a path replacement controller 111 which enables a path replacement between the old and new subsystems to be performed without stopping the CPU access, as will be described hereinlater, by relaying access requests arriving from the CPU 10 through second access paths 20' and 21' to the old CU 13 through third access paths 30 and 31; and a data migration controller 112 for controlling the data migration. The path replacement controller 111 performs an operation equivalent to that executed by the CPU 10 in an access to the old CU 13 using the third access paths 30 and 31.

In the data migrating process of the embodiment, the connection is switched from the first access paths 20 and 21 which are connected between the CPU 10 and the originally used old CU 13 to the second access paths 20' and 21' provided between the CPU 10 and the new CU 11 serving as a data migration destination, and the new CU 11 and the old CU 13 are connected via the newly provided third access paths 30 and 31. The new CU 11 and the new VOL 12 are connected via a device path 12a and the old CU 13 and the old VOL 14 are connected via a device path 14a.

Figure 2:
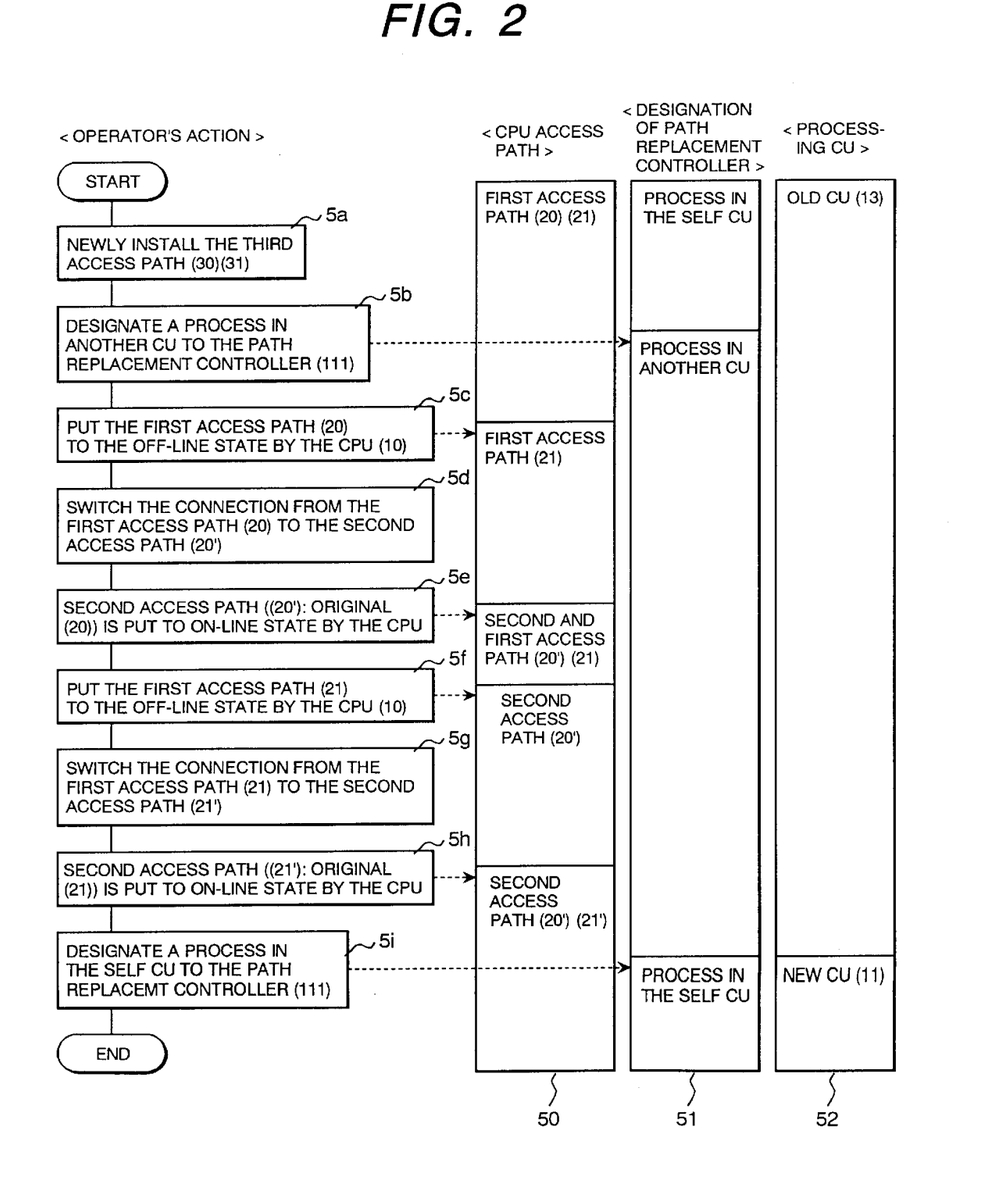
- FIG. 2 is a flowchart showing an example of the action of the information processing system to which the subsystem replacement method of the invention is applied.

An example of the data migrating process in the information processing system having the configuration shown in FIG. 1 will be described with reference to the flowchart of FIG. 2. In FIG. 2, operator's actions 5a, 5b, . . . 5i for performing the path replacement between subsystems in the embodiment, CPU access path 50 showing the access paths which are changed according to the pass replacement and are used by the CPU 10, designation 51 of path replacement controller showing the state designated in the path replacement controller 111, and processing CU 52 showing the CU for processing an access from the CPU 10 are shown while time-sequentially associated with each other.

Since a process is usually executed before the start of the action of the operator, the first access paths 20, 21 are used from the CPU 10, and the CPU access path 50 therefore shows the first access paths 20 and 21. Since the designation 51 of path replacement controller is not related to the path replacement, when the CPU 10 makes an access, the access is processed by the new CU 11 and it is designated so that the same access will not be made to the old CU 13 via the third access paths 30 and 31 (which will be provided later) (hereinbelow, such designation will be called a process by a self CU). The processing CU 52 is the old CU 13. The operator newly installs the third access paths 30 and 31 between the new CU 11 and the old CU 13 (action 5a).

When the CPU 10 accesses to the path replacement controller 111, the access is not processed by the new CU 11 but a designation to make the same access (relay the access) to the old CU 13 through the third access paths 30 and 31 is made (hereinbelow, such a designation will be called a process in another CU) (action 5b).

The first access path 20 is put into an off-line state by the CPU 10 (action 5c), the access of the CPU 10 using the path 20 is stopped, and only the first access path 21 is used as the CPU access path 50. Subsequently, the connection is switched from the first access path 20 in the original configuration to the second access path 20' (action 5d).

After completion of the connection, the second access path 20' (original first access path 20) is put into the on-line state by the CPU 10 (action 5e).

Consequently, both of the access through the first access path 21 which has been used until then and the access through the second access path 20' are started as accesses from the CPU 10 to the old CU 13 as shown in the CPU access path 50. The access using the second access path 20' is made to the new CU 11 but is not processed by the new CU 11. The path replacement controller 111 makes the same access to the old CU 13 via the third access paths 30 and 31 so as to be processed by the old CU 13. Consequently, the CPU can access to the old CU 13 via any of the second access path 20' and the first access path 21 and the process is relayed so as to be executed by the old CU 13. By a similar procedure, the first access path 21 is switched to the second access path 21' by the actions 5f, 5g, and 5h. Thus, the connection can be switched from the access path between the CPU 10 and the old CU 13 to the access path between the CPU 10 and the new CU 11 without stopping the access.

Finally, after all of the replacements are finished, the designation of the path replacement controller 11 is changed to the process by the self CU (action 5i), so that the new CU 11 starts to process the access request from the CPU 10 as shown in the processing CU 52. In this manner, the processing subsystem can be switched from the old CU 13 and the old VOL 14 to the new CU 11 and the new VOL 12 without stopping the access from the CPU 10.

The start timing of the data migration in the subsystem replacement accompanied by the data migration as in the embodiment shown in FIG. 1 will be examined here. The data migrating process can be performed if there is at least one of the third access paths 30 and 31.

If data migration is, however, performed (started) after switching the connection to the new CU 11 from the first access path 20 to the second access path 20' and before the first access path 21 is switched to the second access path 21', there is the possibility that data updating operation from the CPU 10 to the old CU 13 is executed to only the migrated part via the first access path 21. If such an updating operation is performed by chance, the new CU 11 does not know it, so that the data is dropped by the migration.

According to the embodiment, all of data can be migrated without being dropped and the data migration without stopping the access can be carried out in such a manner that, by relaying an access through the second access paths 20' and 21' to the old CU 13 via the third access paths 30 and 31 by the path replacement controller 111 provided for the new CU 11, the connection from the CPU 10 is switched from the first access paths 20 and 21 to the second access paths 20' and 21', start of data migration is instructed to the data migration controller 112, and synchronously, designation to the path replacement controller 111 is changed to execute a process by the self CU.

Figure 3:
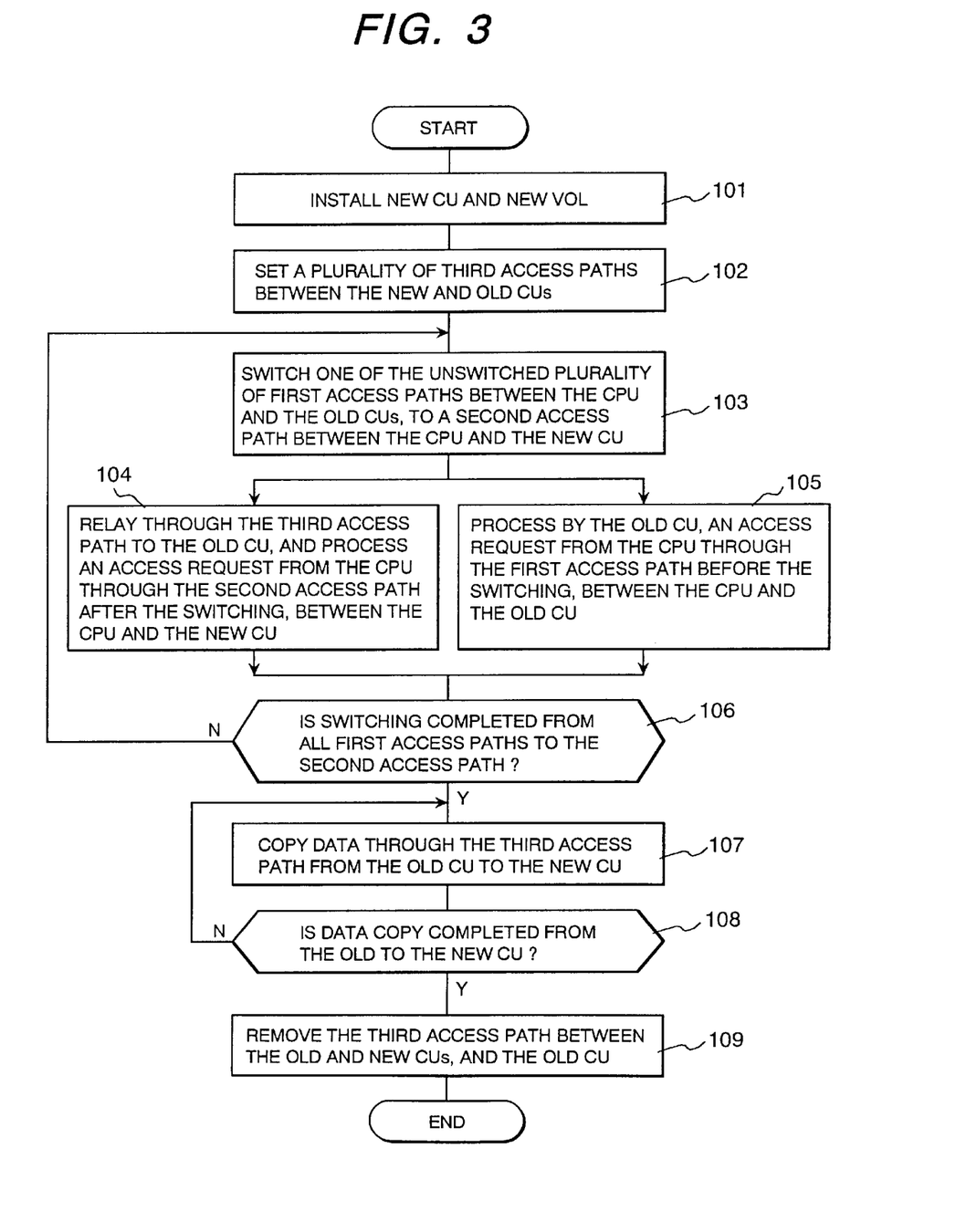
FIG. 3 is a flowchart showing an example of the action of the information processing system to which the subsystem replacement method of the invention is applied.

The whole procedure of the subsystem replacement process including the data migration in the embodiment will be described below with reference to the flowchart of FIG. 3.

In steps 101 to 106, as shown in FIG. 2, the path switching operation for switching the first access paths 20 and 21 to the second access paths 20' and 21' is executed. After that, an operation for copying (migrating) data from the old CU 13 to the new CU 11 through the third access paths 30 and 31 (step 107) is executed to all of data necessary to be migrated in the old VOL 14 controlled by the old CU 13 (step 108) and then the third access paths 30 and 31, the old CU 13, and the old VOL 14 are removed (step 109).

Figure 4:
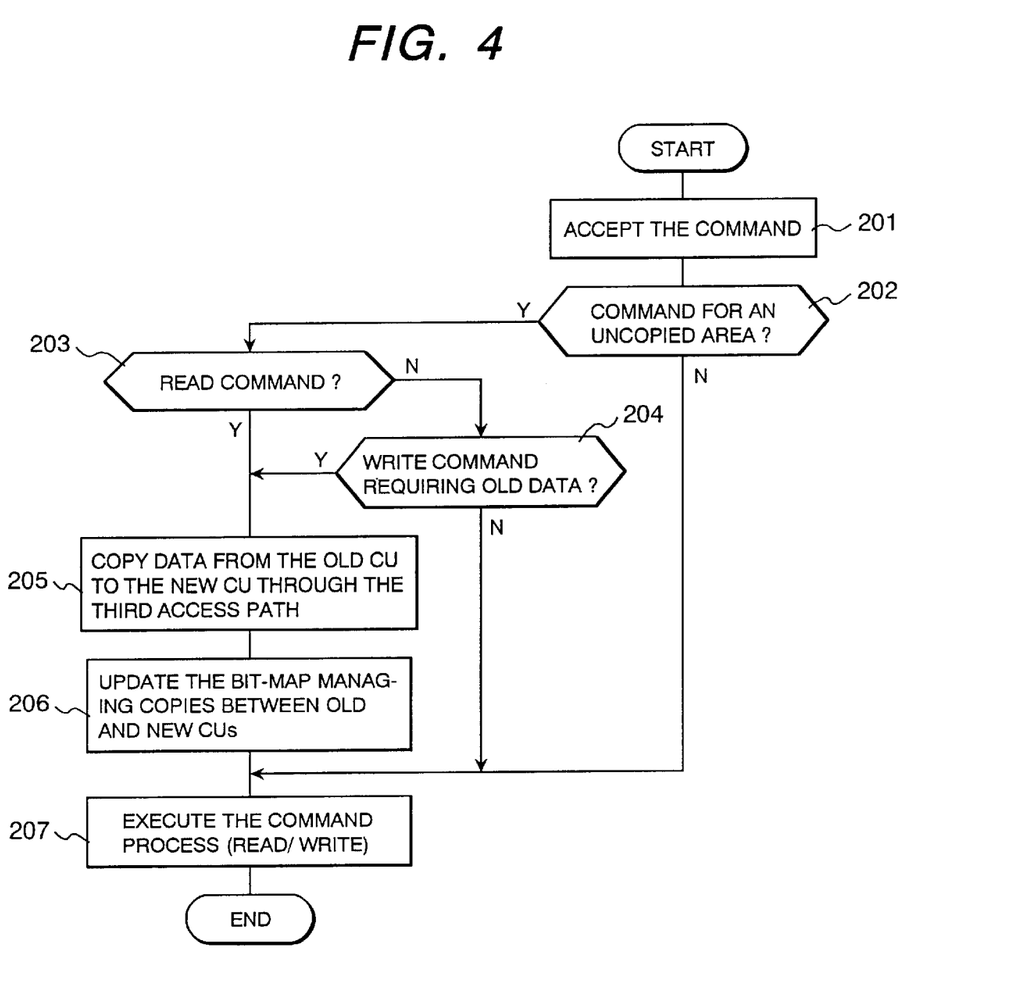
FIG. 4 is a flowchart showing an example of the action of the information processing system to which the subsystem replacement method of the invention is applied.
Figure 5:
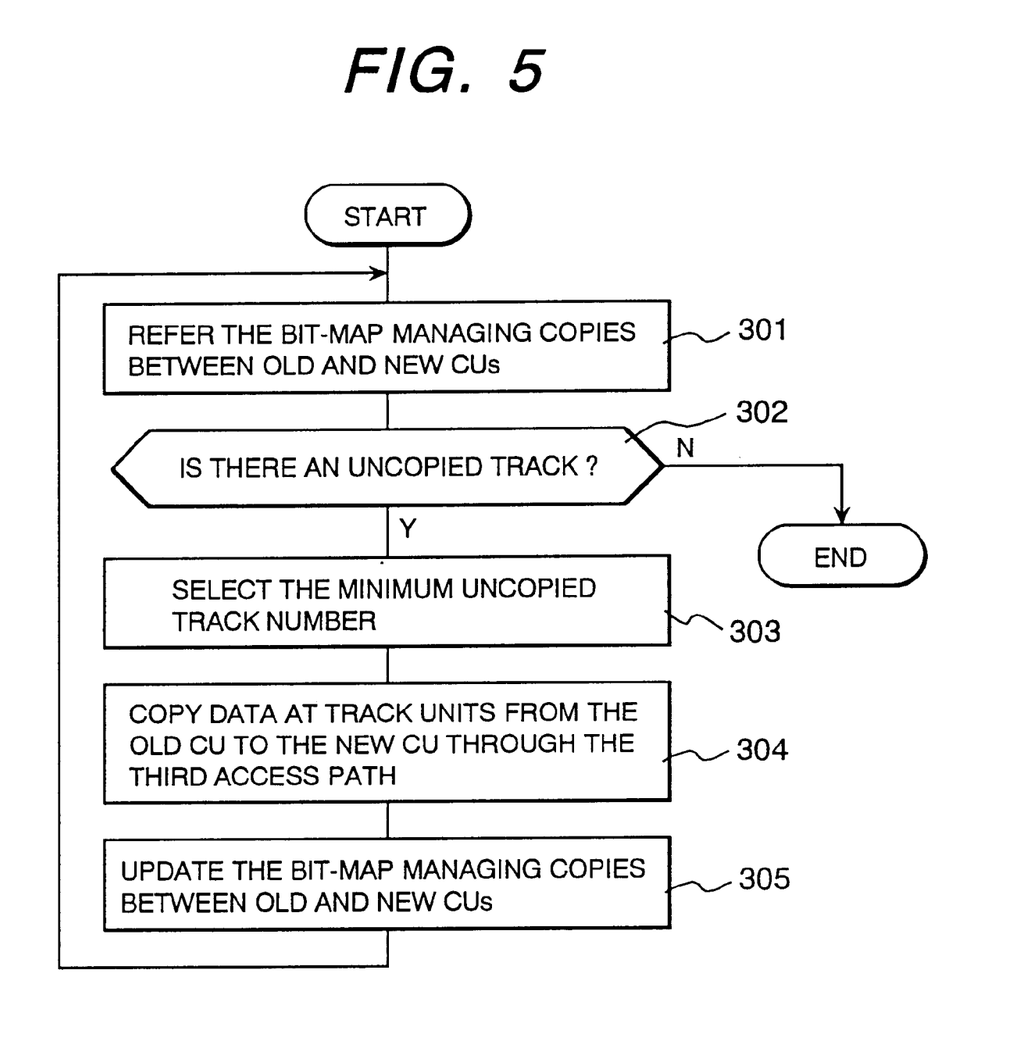
FIG. 5 is a flowchart showing an example of the action of the information processing system to which the subsystem replacement method of the invention is applied.

An example of the process for requesting the access from the CPU 10 during the data migration in steps 107 and 108 is shown by flowcharts in FIGS. 4 and 5.

When the data is copied on a track unit basis as an example of the copying process of FIG. 5, the following operation is executed to all of tracks to be migrated. Referring to a bit map for copy management (not shown) (step 301), whether there is an uncopied track in the old VOL 14 or not is checked (step 301). If yes, the minimum track number is selected among the uncopied tracks (step 303), the data is copied to the new VOL 12 through the third access paths 30 and 31 (step 304), and then the bit map for copy management is updated by setting the copied tracks to a "copied" state (step 305).

On the other hand, as shown in FIG. 4, the new CU 11 accepts a command from the CPU 10 (step 201), checks whether an area accessed by the command is an uncopied area or not (step 202), and if yes, checks whether the command is a read command or not (step 203). When it is a read command, tracks including the data to be accessed are copied from the old VOL 14 to the new VOL 12 via the third access paths 30 and 31 (step 205). After that, the bit map for copy management is updated by setting the copied tracks to a "copied" state (step 206) and the command process is executed (step 207).

On the other hand, it is determined in step 202 that the access is made to the copied area, the command process is immediately executed in step 207.

When it is determined that the command is other than the read command (that is, write command) in step 203, whether it is the write command requiring old data or not is checked (step 204). If YES, processes in step 205 and subsequent steps are executed. If NO, the command process in step 207 is executed.

That is, the copying process as shown in FIG. 5 is executed as a background process and the access requesting process shown in FIG. 4 is performed whenever necessary.

By processes as above, the data can be migrated from the old subsystem to the new subsystem without stopping the information processing system, and the data migrating process after switching from the first access paths 20 and 21 to the second access paths 20' and 21' under stopless operation can be smoothly and accurately performed.

Although two access paths are used in the embodiment, three or more access paths can be also provided. In this case, the access paths can be switched one by one, or by a proper number of access paths each time on two (or more) occasions in a manner similar to the foregoing embodiment.

(Second embodiment)

Figure 6:
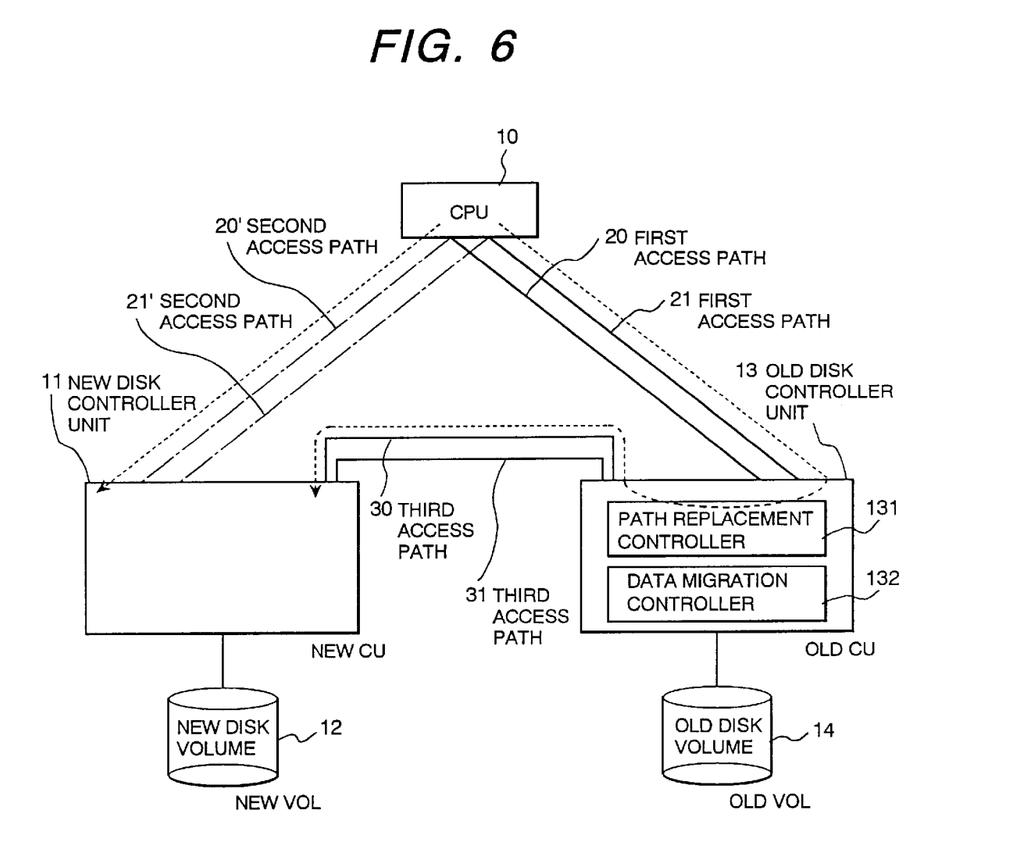
FIG. 6 is a conceptual diagram showing another embodiment of the information processing system to which the subsystem replacement method of the invention is applied.
Figure 7:
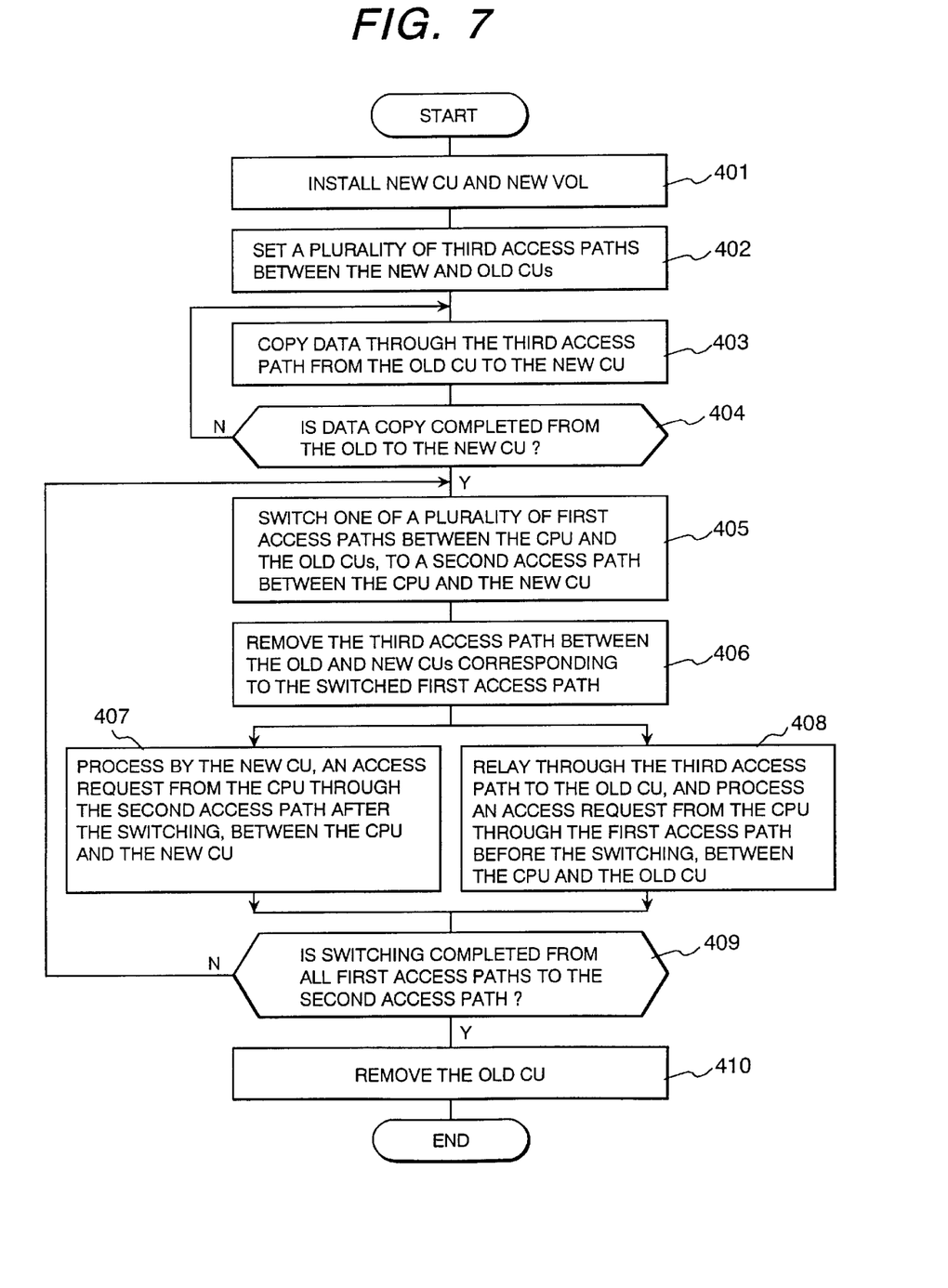
FIG. 7 is a flowchart showing an example of the action of another embodiment of the information processing system to which the subsystem replacement method of the invention is applied.
Figure 8:
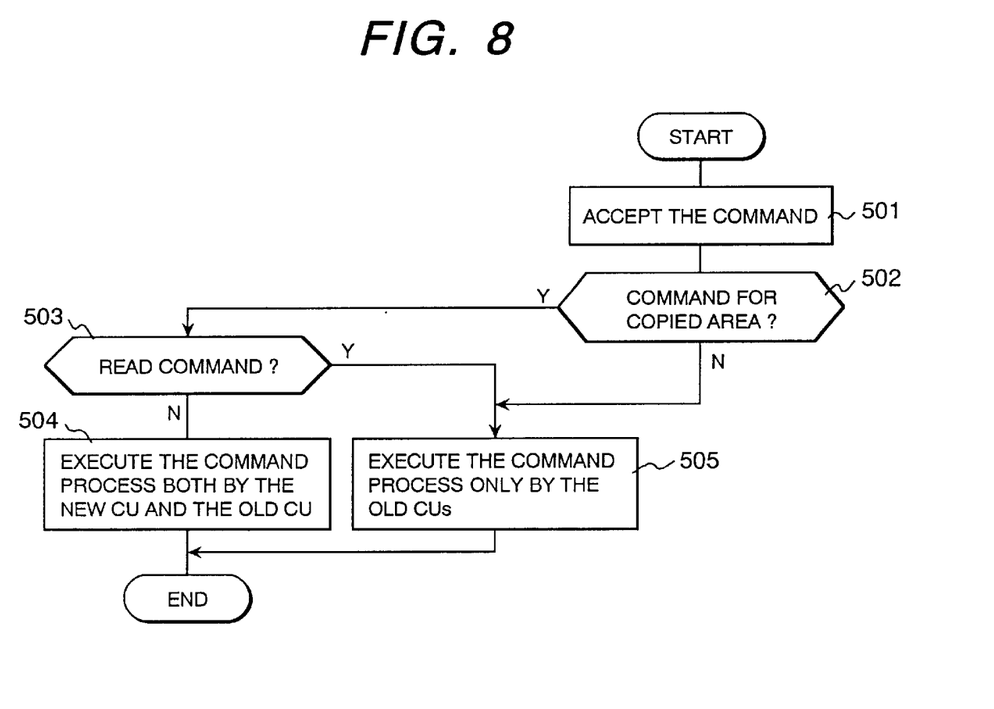
FIG. 8 is a flowchart showing an example of the action of another embodiment of the information processing system to which the subsystem replacement method of the invention is applied.

FIG. 6 is a conceptual diagram showing another embodiment of the subsystem replacement method of the invention. FIGS. 7 and 8 are flowcharts showing the replacement method.

The configuration of the information processing system of the embodiment is different from that of the first embodiment with respect to the point that the new CU 11 does not have the path replacement controller and the data migration controller and the old CU 13 is provided with a path replacement controller 131 and a data migration controller 132.

First, a path switching operation by relaying an access request sent to the old CU 13 through the first access paths 20 and 21 to the new CU 11 via the third access paths 30 and 31 will be described.

Since the path replacement is executed during an ordinary process, a process by the self CU is designated in the path replacement controller 131. First, third access paths 30 and 31 between the new CU 11 and the old CU 13 are newly installed (steps 401 and 402). At the time point when the third access paths 30 and 31 are newly installed, start of the data migration is instructed to the data migration controller 132 to start data migration (step 403). At the time point when all of the data has been copied and the new CU 11 becomes ready for processing an access directly from the CPU 10 (step 404), the other CU, that is, the new CU 11 is allowed to process the access.

The connection is switched from the first access path 20 to the second access path 20' (step 405). In this instance, the first access path 20 is put into an off-line state by the CPU 10 and the access of the CPU 10 using the path is stopped. Further, the third access path 30 is removed (step 406). After completion of the connection, the second access path 20' (original first access path 20) is put into the online state by the CPU 10.

As accesses from the CPU 10 to the old CU 13, both an access to the old CU 13 using the first access path 21 through which the access has been made until then and an access to the new CU 11 using the second access path 20' are started. Although the new CU 11 is accessed through the second access path 20', for the new CU 11, the access is received through the second access path 20' instead of the third access path 30, so that the process is continued (step 407). The access using the first access path 21 to the old CU 13 is relayed to the new CU 11 via the third access path 31 and is processed (408).

By a similar procedure, the first access path 21 is switched to the second access path 21' (step 409) and the third access path 31 is removed. In this manner, the access path from the CPU 10 to the old CU 13 can be switched to that from the CPU 10 to the new CU 11 without stopping the access. After that, the old CU 13 and the old VOL 14 controlled by the old CU 13 are removed (step 410).

In this manner, the data migration without stopping the access can be carried out.

An example of an access request (command process) generated from the CPU 10 during the path switching operation of steps 405 to 409 after completion of the data migration of steps 403 and 404 will be described with reference to FIG. 8.

When a command from the CPU 10 is accepted (step 501), the old CU 13 checks whether the area accessed by the command is copied area or not (step 502). If it is the copied area, whether the command is a read command or not is checked (step 503). If it is not a read command (in case of a write command), the command process is executed by both of the new CU 11 and the old CU 13 so that the contents of both of the CUs do not differ from each other (step 504). On the other hand, when the command is determined as a read command in step 503, the old CU 13 performs the command process by using the data of the old VOL 14 (step 505).

When it is determined in step 502 that the access is made to an uncopied area, the old CU 13 executes the command process by using the data of the old VOL 14.

With the processes, by relaying the access request to the new CU 11 through the third access paths 30 and 31 by the path replacement controller 131 provided on the old CU 13 side, the old subsystem can be replaced with the new subsystem without stopping the information processing system and the path switching operation during the data migration can be accurately executed in the state where the access is not stopped.

(Third embodiment)

Figure 9:
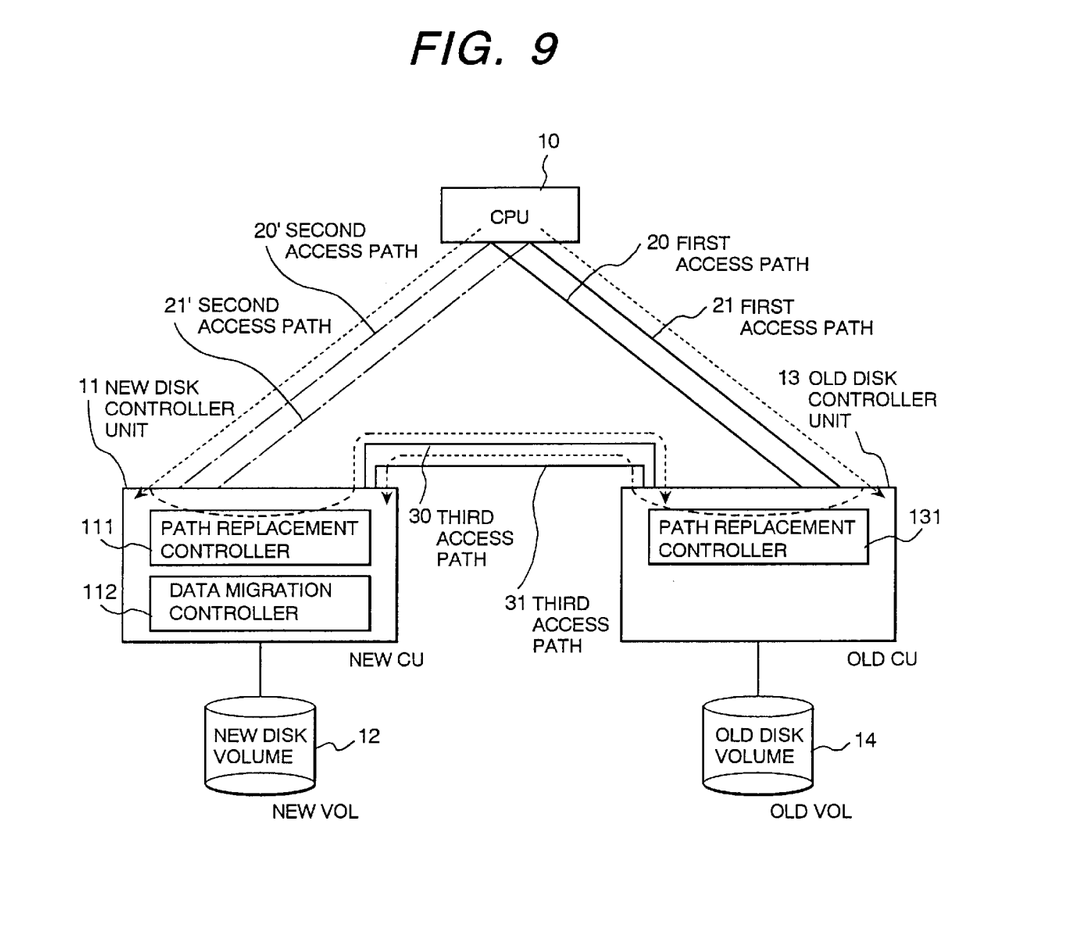
FIG. 9 is a conceptual diagram showing another embodiment of the information processing system to which the subsystem replacement method of the invention is applied.

FIG. 9 shows another embodiment of the invention. The configuration of the embodiment is characterized in that the old CU 13 is also provided with the path replacement controller 131.

Since the path replacement is not executed during the ordinary process, a process by the self CU is designated in the path replacement controllers 111 and 131. First, third access paths 30 and 31 are newly provided between the new CU 11 and the old CU 13. The path replacement controllers 111 and 131 are designated so as to process an access from the CPU 10 by the self CU and make the same access to the other CU through the third access paths 30 and 31 (the designation will be called hereinbelow a process by both of the CUs). The access from the old CU 13 to the new CU 11 becomes an error since there is no data yet in the new CU 11. There is no problem with a process from the CPU 10 since it is executed by the old CU 13.

The data replacement controller 112 is instructed to start the data migration. At this time point, in the new CU 11, an access from the old CU 13 is normally processed with respect to the data copied part. With respect to an uncopied part, since the data is read from the replacement source by a conventional data migrating function, it is normally processed. During the data migration, the connection is switched from the first access path 20 to the second access path 20'. In this instance, the first access path 20 is put into an off-line by the CPU 10, thereby stopping the access of the CPU 10 using the path 20. When the connection is completed, the second access path 20' (original first access path 20) is put into the online state by the CPU 10.

As accesses from the CPU 10 to the old CU 13, both the access through the first access path 21 which has been used until then and an access using the second access path 20' are started. The access using the second access path 20' can be made to the new CU 11 and the new CU 11 process the access as well as the access from the old CU 13 which has been accepted. Since the access is from the CPU 10, however, the access is similarly made to the old CU 13. In such a state, the CPU 10 accesses to both of the old CU 13 and the new CU 11 and each CP accesses to the other CU as well. Consequently, even if an input/output process is interrupted and accesses are made via opposite paths (the second access path 20' and the first access path 21), the process can be performed.

By a similar procedure, the first access path 21 is switched to the second access path 21'. As mentioned above, both of the old CU 13 and the new CU 11 have the path replacement controllers 131 and 111, respectively, and the first access paths 20 and 21 from the CPU 10 to the old CU 13 can be switched to the second access paths 20' and 21' to the new CU 11 without stopping the access of the CPU 10.

After that, all of data to be migrated from the old CU 13 to the new CU 11 is migrated (copied) by the conventional data migrating function by the data migration controller 112 provided on the new CU 11 side. The data migration during which the connection can be switched from the first access paths 20 and 21 to the second access paths 20' and 21' can be realized without stopping the access of the CPU 10.

(Fourth embodiment)

Figure 10:
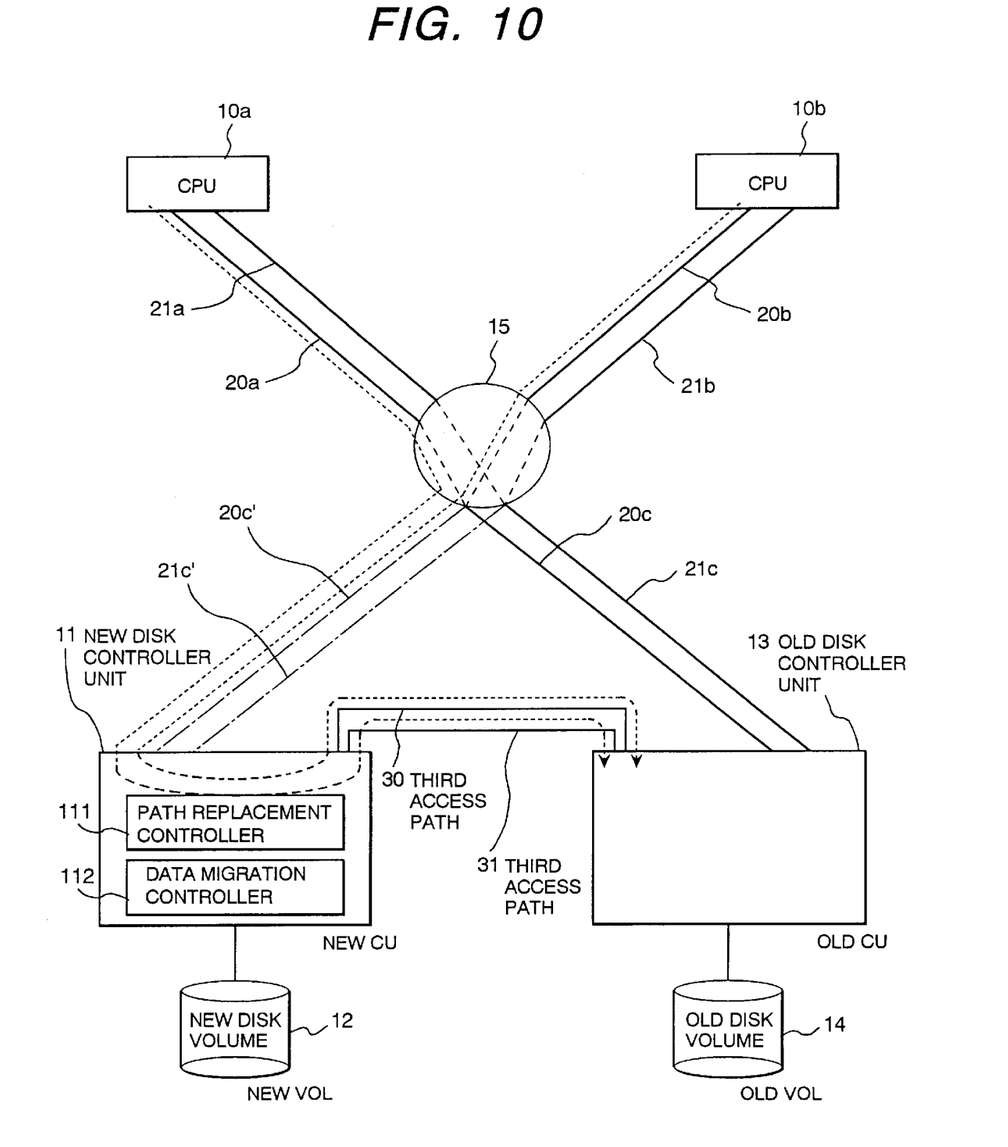
FIG. 10 is a conceptual diagram showing an example of the configuration and action of another embodiment of the information processing system to which the subsystem replacement method of the invention is applied.

FIG. 10 is a conceptual diagram showing the configuration of another embodiment of the invention. According to the configuration of the embodiment, a plurality of CPUs 10a and 10b are provided instead of a single CPU 10. The CPU 10a is connected through access paths 20a and 21a to a path switching device 15 for dynamically switching access paths and the CPU 10b is connected to the path switching device 15 via access paths 20b and 21b, and the path switching device 15 and the old CU 13 are connected via first access paths 20c and 21c.

In the embodiment, the connection is changed from the first access paths 20c and 21c to second access paths 20c' and 21c' between the path switching device 15 and the new CU 11 as a data migration destination.

An access from the CPU 10a through the access path 20a is made via the path switching device 15 to the old CU 13 via the first access path 20c. Likewise, the CPU 10a accesses the old CU 13 through the access path 21a and the first access path 21c. The CPU 10b accesses the old CU 13 through the access path 20b and the first access path 20c or through the access path 21b and the first access path 21c. In such a case, although the first access path 20c is physically a single path, it has two logical access paths so as to distinguish between the access from the access path 20a and the access from the access path 20b.

Likewise, in the old CU 13 as well, a second access path 20c' functions as two logical access paths corresponding to the access paths 20a and 21a and a second access path 21c' also functions as two logical access paths corresponding to the access paths 20b and 21b. The two paths are recognized as different access paths from the CPUs 10a and 10b and processed.

As shown in FIG. 1, the path replacement controller 111 is provided on the new CU 11 side and the access request from the second access path is relayed to the old CU 13 side via the third access paths 30 and 31, thereby executing the access path switching operation from the first access path to the second access path in a stopless state, and the data migration is performed after completion of the path replacement. By a similar procedure, when the first access path 20c is switched to the second access path 20c', it is similarly recognized also in the new CU 11.

That is, the accesses from two logical access paths are distinguished and an access is determined from which one of the CPUs 10a and 10b. During the access path switching operation, the path replacement controller 111 relays an access from the CPU to the old CU 13 and makes the same access. Naturally, it is necessary to make the old CU 13 distinguish from which CPU the access arrived. The distinction is made according to the access paths which are different. In the embodiment, therefore, it can be realized by using the third access path 31 for the access from the CPU 10a and the third access path 30 for the access from the CPU 10b. In the case where the first access path 21c is switched to the second access path 21c', the distinction is similarly made. When there are a plurality of CPUs connected to the old CU 13 as mentioned above, the path replacement and data migration between subsystems can be realized in the embodiment shown in FIG. 10 by providing the third access paths of the number which is at least equal to the number of the CPUs between the new CU 11 and the old CU 13.

Although the third access path 30 is used for the access from the CPU 10a and the third access path 31 is used for the access from the CPU 10b in the embodiment, when only the third access path 30 can be used, that is, when the number of access paths between the new CU 11 and the old CU 13 is smaller than the number of CPUs, the path replacement and data migration can be also performed by making the third access path 30 have two logical access paths and properly using the two logical access paths. Also in the case where the number of third access paths is more than sufficient (more than the number of CPUs), it will be obviously understood that a plurality of logical access paths can be provided and used. It is also possible to make association among the paths in such a manner that the second access path 20c' is associated with the third access path 30 and the second access path 21c' is associated with the third access path 31, and the logical access paths provided for the second access paths 20c' and 21c' are likewise provided on the third access paths 30 and 31.

(Fifth embodiment)

Figure 11:
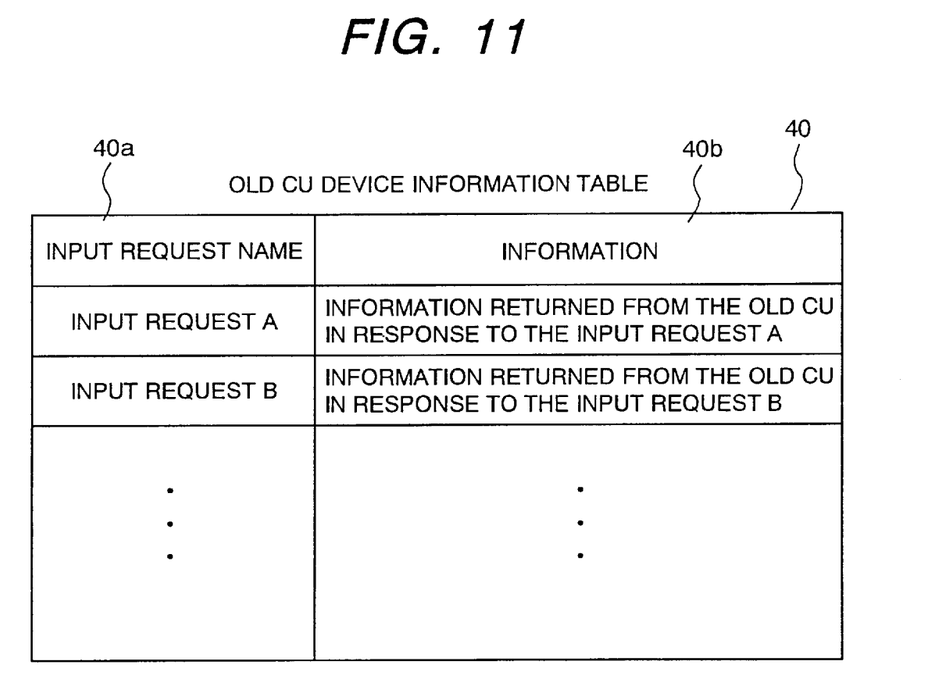
FIG. 11 is a conceptual diagram showing an example of the contents of a storage means used in the another embodiment of the subsystem replacement method of the invention.

Another embodiment of the invention will be described with reference to FIGS. 1 and 11. FIG. 11 is a conceptual diagram showing an example of an old CU device information table 40 in which the device information of the old CU 13 is stored in a storage means such as a buffer memory provided for the new CU 11 of the information processing system shown in FIG. 1.

Usually, in a subsystem operating under the control of a CPU in an information processing system, in order to discriminate the environment, specification, and the like of the subsystem by the CPU, there is provided a command interface (device information input request) for reading the information such as the device configuration of the subsystem on the CPU side when necessary.

In response to a device information input request from the CPU 10, if the same request is sent to the old CU 13 while the old CU 13 is connected and information returned is inputted to the CPU 10, an access path failure or the like is not determined by the CPU 10 and it can be continuously used as a subsystem. After completion of the data migration, however, the old CU 13 is usually removed. In the embodiment, therefore, in order to respond (input) the device information of the old CU 13 to the CPU 10 even after the removal of the old CU 13, the new CU 11 sends all of device information input requests to the old CU 13 via the third access paths 30 and 31 in advance, an input request name 40a and information 40b sent from the old CU 13 in response to the input request are recorded as a set into the old CU device information table 40 and, after that, the information 40b in the old CU device information table 40 is read out and sent in response to the device information input request from the CPU 10.

Also in the case where the CPU 10 is a CPU which compares the present device information with device information in the past, the new CU 11 can be continuously used after removal of the old CU 13. That is, the old CU 13 can be removed without a fear of system down or the like. Although a storage means such as the old CU device information table 40 in the new CU 11 is used in the embodiment, it is also possible to rewrite inherent device information of the new CU 11 by the information of the old CU 13.

As mentioned above, according to the invention, since the paths can be switched from the old subsystem as a replacement source to the new subsystem as a replacement destination without stopping any CPU access, complete stopless system replacement can be realized.

Further, in the disk subsystem, even when the function of switching paths without stopping the CPU access is provided only for the new disk subsystem as a replacement destination, complete stopless data migration even at a path replacing time can be performed.

In the disk subsystem, in the case where the function of switching paths without stopping the CPU access is provided only for the old disk subsystem as a replacement source, complete stopless data migration even at the path replacing time can be performed.

In the disk subsystem, by providing the function of switching paths without stopping the CPU access for both of the new subsystem as the replacement destination and the old disk subsystem as the replacement source, complete stopless data migration in which paths can be switched during the data migration can be carried out.

Further, complete stopless system replacement can be also performed in a subsystem operating under the controls of a plurality of CPUs.

Further, even in case of the CPU for storing the device information of the subsystem and comparing the stored information with present device information of the subsystem which is newly read, thereby detecting a failure in an access path or the like, by preliminarily reading the device information of the old subsystem by the new subsystem, storing the information in the new subsystem, and sending the stored device information of the old subsystem in response to a device information input request, the paths can be switched without stopping the CPU access and the old subsystem as the replacement source can be promptly removed.

Although the invention has been described on the basis of the embodiments, it will be obviously understood that the invention is not limited to the foregoing embodiments but can be variably changed without departing from the gist.

For example, the storage subsystem accompanied by the data migration has been described as an example of the subsystem, the invention is not limited to the subsystem but can be widely applied to a general subsystem which does not require the data migration.

According to the subsystem replacement method of the invention, an effect such that a higher level device can continuously access to a subsystem also during switching operation from the old subsystem to the new subsystem is obtained.

An effect such that data can be migrated in a stopless state without requiring to stop an access from the higher level device to the subsystem accompanied by the data migration procedure is also obtained.

An effect such that the replacement of the old subsystem operating under the control of a plurality of higher level devices to the new subsystem can be smoothly performed under stopless operation is also obtained.

An effect such that subsystems can be smoothly replaced while avoiding occurrence of a failure caused by a change in environment of device information or the like in association with a replacement of the old subsystem to the new subsystem is obtained.

What is claimed is:

1. A subsystem replacement method of replacing an old disk subsystem with a new disk subsystem, comprising the steps of:

connecting a higher level device and a new disk subsystem through a plurality of access paths;

putting the plurality of access paths connecting said higher level device and an old disk subsystem except for at least one access path into an off-line state switching the connection between said higher level device and the off-lined access paths to the access paths between said higher level device and said new disk subsystem;

putting the switched access paths into an on-line state;

putting the remaining access path connecting said higher level device and said old disk subsystem into an offline state;

switching the connection to said higher level device from the off-lined access path to the remaining access path of said new disk subsystem; and putting the switched access path into an on-line state.

2. A method according to claim 1, wherein data migration from said old disk subsystem to said new disk subsystem is started after completion of the connection switching operation of all of said access paths.

3. A method according to claim 1, wherein the access paths between said higher level device and the disk subsystems are switched after completion of data migration from said old disk subsystem to said new disk subsystem, and after that, an access request is relayed to said old disk subsystem through said new disk subsystem.

4. A method according to claim 1, wherein data migration from said old disk subsystem to said new disk subsystem is executed in parallel with the connection switching operation of said access paths.

5. A subsystem replacement method comprising the steps of:

providing an access path connecting an old disk subsystem and a new disk subsystem;

connecting a higher level device and said new disk subsystem via a plurality of access paths;

putting a plurality of access paths connecting said higher level device and the old disk subsystem except for at least one access path into an off-line state;

switching the connection to said higher level device between the off-lined access paths to the access paths provided between said higher level device and said new disk subsystem;

putting the switched access paths into an on-line state;

connecting said higher level device and said old disk subsystem through said new disk subsystem;

putting the remaining access path connecting said higher level device and the old disk subsystem into an off-line state;

switching the connection to said higher level device from the off-lined access path to the remaining access paths of the new disk subsystem; and putting the switched access path into an on-line state.

6. A method according to claim 5, wherein data migration from said old disk subsystem to said new disk subsystem is executed after completion of the switching operation of the connections of the access paths between said higher level device and the disk subsystems.

7. A method according to claim 5, wherein the switching operation of the access paths between said higher level device and the disk subsystems is started after completion of data migration from said old disk subsystem to said new disk subsystem, and an access request is relayed to said old disk subsystem via said new disk subsystem during the switching operation.

8. A method according to claim 5, wherein data migration from said old disk subsystem to said new disk subsystem is executed through the access paths between said old disk subsystem and said new disk subsystem in parallel with said access path switching operation.

9. A method according to claim 5, wherein when the new disk subsystem operates under the control of a plurality of said higher level devices, the number of access paths installed between the old disk subsystem and the new disk subsystem is equal to the number of said higher level devices logically or physically.

* * * * *